United States Patent [19]
Veigl

[11] Patent Number: 5,718,425
[45] Date of Patent: Feb. 17, 1998

[54] APPARATUS FOR CONSECUTIVELY PROCESSING SHEET-LIKE RECORD CARRIERS

[75] Inventor: Johann Veigl, Vienna, Austria

[73] Assignee: U.S. Philips Corporation, New York, N.Y.

[21] Appl. No.: 650,567

[22] Filed: May 20, 1996

[30] Foreign Application Priority Data

May 23, 1995 [EP] European Pat. Off. ............. 95201345

[51] Int. Cl.$^6$ ................................................. B65H 3/52
[52] U.S. Cl. .................................................... 271/121
[58] Field of Search ......................................... 271/121

[56] References Cited

U.S. PATENT DOCUMENTS 5,553,842 9/1996 Wilcox et al. ............... 271/121 X

FOREIGN PATENT DOCUMENTS

0434285A2 6/1991 European Pat. Off. ......... H04N 1/00
1321224 12/1989 Japan ............................... 271/121
3267233 11/1991 Japan ............................... 271/121

Primary Examiner—David H. Bollinger
Attorney, Agent, or Firm—Robert M. Mc Dermott

[57] ABSTRACT

In an apparatus (1) for consecutively processing sheet-like record carriers (10), comprising a holder (10) for holding a stack (11) of record carriers (10) and a separating device (15) for separating the currently outermost record carrier (10a), which device comprises at least one separating roller (19) and a holdback member (23) with a holdback surface (24) for retaining all the record carriers of the stack except for the outermost record carrier (10a), the holdback member (23) comprises a wedge-like portion (66) made of a non-elastic material and having a bounding edge (67) with which the wedge-like portion (66) can be brought into contact with the circumferential surface (20) of the separating roller (19), and the holdback surface (24) of the boldback member (23) bounds the wedge-like portion (66) and terminates at the bounding edge (67).

18 Claims, 4 Drawing Sheets

APPARATUS FOR CONSECUTIVELY PROCESSING SHEET-LIKE RECORD CARRIERS

The invention relates to an apparatus which is constructed for consecutively processing sheet-like record carriers and which comprises a holder for holding a stack of at least two record carriers and a separating device for separating the currently outermost record carrier of the stack from the stack, which separating device comprises at least one separating roller with a cylindrical circumferential surface, which separating roller is drivable so as to be rotatable about a roller axis in order to drive the currently outermost record carrier to be separated from the stack, and which comprises at least one holdback member with a holdback surface for retaining all the record carriers of the stack except for the outermost record carrier to be separated from the stack, means for enabling at least one relative movement between the separating roller and the holdback member, and spring means for producing such a relative movement between the separating roller and the holdback member, the relative movement between the separating roller and the holdback member caused by the spring means enabling the cylindrical circumferential surface of the separating roller and a part of the holdback member to be brought into contact with one another, and a feed-in zone for the record carriers of the stack to the separating roller being formed between the circumferential surface of the separating roller and the holdback surface of the holdback member, which zone tapers towards the circumferential surface of the separating roller, in which feed-in zone the currently outermost record carrier to be separated is in contact with the circumferential surface of the separating roller.

An apparatus of the type deemed in the opening paragraph is known, for example, from EP-A2-0 434 285. This known apparatus comprises a substantially strip-shaped rubber holdback member which is disposed in the apparatus in such a manner that the longitudinal strip direction is oriented substantially transversely to the roller axis of a separating roller. At the location of one strip end the strip-shaped holdback member is secured to a support which is pivotable about an axis and which is spring-loaded so as to urge the holdback member towards the separating roller. By means of an auxiliary lever, which is pivotably mounted on the support and which has a projection which is urged against the other strip end of the strip-shaped holdback member under the influence of a tension spring stretched between the auxiliary lever and the support, the rubber holdback member is deformed in such a manner that the holdback member pushes the outermost record carrier, which has already been separated, against the circumferential surface of the separating roller with a comparatively large pressure surface adjacent its holdback surface. This large-area contact of the pressure surface of the holdback member, which consists of rubber having a comparatively high coefficient of friction, with the outermost record carrier, which has already been separated, has the disadvantage that owing to the unfavourable friction conditions a comparatively large braking force is exerted on the record carrier, which has an adverse effect on the drive and transport of the record carrier. Moreover, it is to be noted that in the known apparatus the holdback surface of the strip-shaped holdback member and the circumferential surface of the separating roller enclose a sharp wedge-shaped feed-in zone. As a result of this sharp wedge-shaped feed-in zone and the elastic construction of the holdback member the feed-in zone, which tapers towards the circumferential surface of the separating roller, changes more or less smoothly into the pressure zone, where the pressure surface of the elastic holdback member contacts the circumferential surface of the separating roller. Thus, there is no distinct separation between the feed-in zone for the record carriers of the stack and the pressure zone which follows the feed-in zone and in which each time only the previously separated outermost record carrier is to be moved. Owing to the sharp wedge-shaped feed-in zone, which narrows towards the circumferential surface of the separating roller in such a manner that its height becomes smaller than the thickness of a record carrier, the holdback member is slightly moved away from the circumferential surface of the separating roller via its holdback surface by a record carrier which has been moved into this very narrow part of the feed-in zone by means of the driven separating roller, but this results in the height of the feed-in zone being increased and, consequently, an increased likelihood of a further record carrier to move too far into the narrowest part of the feed-in zone. Moreover, it is to be noted that owing to the very sharp wedge-shaped feed-in zone and the resulting small inclination of the holdback surface of the holdback member relative to the plane of the record carrier to be separated only a comparatively small holdback effect is obtained. As a result of this, the known apparatus has the problem that more than just the outermost record carrier to be separated can relatively easily reach said pressure zone in which the holdback member presses the outermost and already separated record carrier against the circumferential surface of the separating roller, which has the adverse effect that not only the outermost but also at least one further record carrier is separated from the stack of record carriers, which leads to incorrect operation and is consequently undesirable.

It is an object of the invention to preclude the aforementioned problems and to improve an apparatus of the type defined in the opening paragraph simply and without any additional means so as to achieve that each time only the outermost record carrier of a stack of record carriers is separated from this stack in a comparatively reliable manner.

To achieve this object an apparatus of the type defined in the opening paragraph is characterized in that the holdback member comprises a substantially wedge-like portion made of a non-elastic material and having a bounding edge which extends parallel to the roller axis of the separating roller and with which the wedge-like portion of the holdback member can be brought into contact with the circumferential surface of the separating roller, and the holdback surface of the holdback member bounds the wedge-like portion and terminates at the bounding edge. The measures in accordance with the invention ensure that the feed-in zone for the record carrier from the substantially wedge-like portion of the holdback member to the separating roller is not bounded smoothly but sharply and at the location of the wedge-shaped portion of the holdback member the inclination of the holdback surface relative to the plane of the sheet-like record carrier to be separated can be comparatively large. As is apparent from experiments, this construction in accordance with the invention provides a high separation reliability, thus assuring with comparatively high reliability that always only one record carrier at a time is separated from a stack of record carriers. Moreover, the measures in accordance with the invention ensure that only at the location of its bounding edge, which consists of a non-elastic material and consequently has a comparatively low coefficient of friction, the holdback member presses a record carrier which has already been separated against the circumferential surface of the separating roller, i.e. that only a comparatively small frictional force occurs between the holdback member and the record carrier, which has the advantage that only a comparatively small friction-dependent braking force is exerted on the record carrier, which is advantageous for the drive and transport of the record carrier.

An advantageous embodiment of an apparatus in accordance with the invention is characterized in that when the bounding edge of the wedge-like portion of the holdback member is directly, i.e. without an interposed record carrier, in contact with the circumferential surface of the separating roller, a radial plane containing the roller axis of the separating roller and the bounding edge and a tangential plane containing the bounding edge and tangent to the holdback surface enclose an angle α with one another, which angle lies within a range of angles between approximately 30° and approximately 65°. Such a construction has proved to be advantageous for an effective holdback action of the holdback surface on the wedge-like portion of the holdback member.

In this respect it has proved to be particularly advantageous if the angle α is substantially 53°. Such a construction has proved to be particularly advantageous in practice.

In an apparatus in accordance with the invention the wedge-like portion of the holdback member may have a curved holdback surface, which depending on the specific requirements may be concave or convex in relation to the circumferential surface of the separating roller starting from the bounding edge. However, in an apparatus in accordance with the invention it has proved to be very advantageous if the holdback surface has a surface portion which is flat starting from the bounding edge. This has proved to be advantageous in order to simplify the construction of the holdback member at the location of the wedge-like portion.

In an advantageous embodiment of an apparatus as defined above, adjacent the flat surface portion starting from the bounding edge, the holdback surface has a further flat surface portion, and the two surface portions adjoin one another along a line-shaped transition zone which extends parallel to the bounding edge.

In an apparatus in accordance with the invention as defined above it has proved to be advantageous if, when the bounding edge of the wedge-like portion of the holdback member is directly, i.e. without an interposed record carrier, in contact with the circumferential surface of the separating roller, a radial plane containing the roller axis of the separating roller and the bounding edge and the tangential plane which is tangent to the surface portion which is flat starting from the bounding edge enclose an angle α with one another within a range of angles between approximately 30° and approximately 65°, and the radial plane containing the roller axis and the bounding edge and the tangential plane which is tangent to the further flat surface portion enclose an angle β with one another which is smaller than the angle α. This has proved to be particularly advantageous in practice.

An embodiment of the apparatus in accordance with the invention which is particularly advantageous in the above-mentioned situation is characterized in that the angle β is approximately 10° to approximately 20° smaller than the angle α. Experiments have shown that such a construction can provide very favourable results in view of different holdback forces.

In this respect it has proved to be particularly advantageous if the angle β is approximately 15° smaller than the angle α. Thus, it is possible to obtain particularly satisfactory results in view of different holdback forces.

In an apparatus in accordance with the invention the holdback member or at least its wedge-like portion may consist of a metal. An advantageous embodiment of an apparatus in accordance with the invention is characterized in that at least the wedge-like portion of the holdback member consists of a thermoplastic material. This is advantageous for low-cost mass production.

It has proved to be particularly advantageous if at least the wedge-like portion of the holdback member consists of polyoxymethylene. This allows the use of commercially available conventional plastics.

An advantageous embodiment of an apparatus in accordance with the invention is characterized in that the holdback member comprising the wedge-like portion with the bounding edge and a support for this holdback member are formed as a single integral part. This is advantageous in view of a construction which is as simple as possible.

In an apparatus in accordance with the invention as defined above it has proved to be advantageous if the support for the holdback member comprising the wedge-like portion with the bounding edge is formed by a lever-arm-type support which is pivotable about a support axis and which has been provided as a means for enabling at least one relative movement between the separating roller and the holdback member. This embodiment is also advantageous in view of a simple construction and a smooth movement of the support.

In an apparatus in accordance with the invention as defined above it has proved to be very advantageous if a blade-spring arm has been provided as a spring means for producing a relative movement between the separating roller and the holdback member comprising the wedge-like portion with the bounding edge, which blade-spring arm acts upon the pivotable lever-arm-type support and which urges the holdback member comprising the wedge-like portion with the bounding edge resiliently towards the circumferential surface of the separating roller. This is advantageous for a simple application of a spring force for resiliently loading the holdback member.

A further advantageous embodiment of an apparatus in accordance with the invention is characterized in that viewed in the direction of the roller axis of the separating roller each end of the wedge-like portion of the holdback member is adjoined by a strip-shaped blade-spring arm which extends transversely to the roller axis and the two blade-spring arms each have an angular portion, the two angular portions being arranged so as to overlap one another viewed in the direction of the roller axis and each of the two angular portions enabling a spring load in a direction towards the circumferential surface of the separating roller to be exerted on the record carriers situated between the circumferential surface of the separating roller and the holdback surface of the holdback member. Thus, it is achieved by simple means that the edges of the record carrier to be separated which cooperate with the holdback surface on the wedge-like portion of the holdback member are kept at least slightly away from the bounding edge of the wedge-like portion of the holdback member along the holdback surface, which is advantageous for a maximal separation reliability.

In an apparatus in accordance with the invention as defined above it has proved to be advantageous if, when the angular portions of the two blade-spring arms are directly, i.e. without an interposed record carrier, in contact with the circumferential surface of the separating roller, a radial plane containing the roller axis of the separating roller and the bounding edge of the wedge-like portion of the holdback member and a further radial plane containing the roller axis of the separating roller and the contact locations of the two angular portions of the two blade-spring arms with the circumferential surface of the separating roller enclose an angle γ with one another, which is angle is within a range of angles between approximately 2° and approximately 25°. Such an embodiment provides a very satisfactory separation reliability.

In this respect it has proved to be particularly advantageous if the angle γ is approximately 7°.

A further advantageous embodiment of an apparatus in accordance with the invention is characterized in that the blade-spring arm which acts upon the pivotable lever-arm-type support and the two blade-spring arms which each have an angular portion to exert a spring load on the record carriers situated in the feed-in zone form parts of an integral blade spring structure. This is advantageous for a construction which is as simple as possible.

The above-mentioned aspects as well as further aspects of the invention will be apparent from and will be elucidated by means of the embodiments described by way of examples hereinafter.

The invention will now be described in more detail with reference to five embodiments shown in the drawings and given by way of examples to which the invention is not limited.

Figure 1:
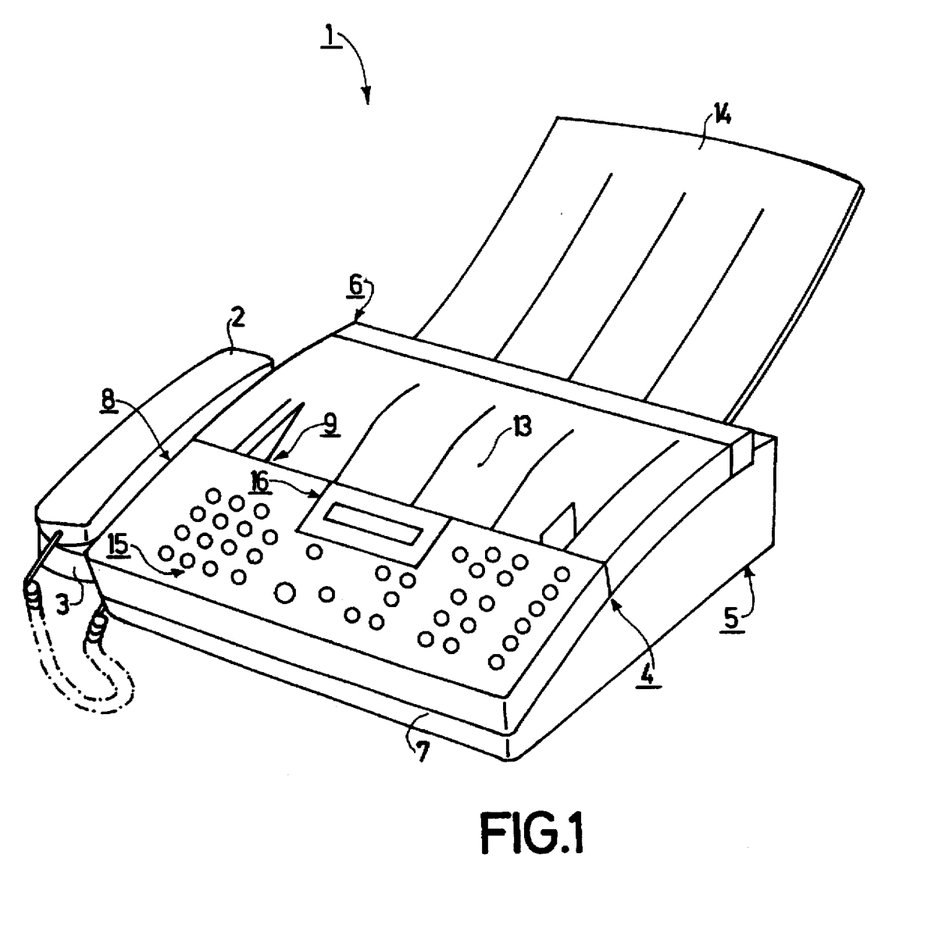
FIG. 1 is an oblique view of an apparatus constructed as a facsimile apparatus and forming a first embodiment of the invention, comprising a holder for holding a stack of record carriers comprising a plurality of record carriers.

FIG. 1 shows diagrammatically an oblique view of a facsimile apparatus 1 combined with a telephone set having a telephone receiver 2 which can be placed on a cradle 3 of the apparatus 1. The facsimile apparatus 1 has been constructed for the consecutive processing of sheet-like record carriers 10, the sheet-like record carriers being sheets of paper provided with alphanumeric characters and drawings which can be loaded or inserted into the apparatus 1 as a stack, after which one sheet of paper after the other is conveyed to a scanning device which scans the characters and drawings for subsequent transmission to another facsimile apparatus.

Figure 2:
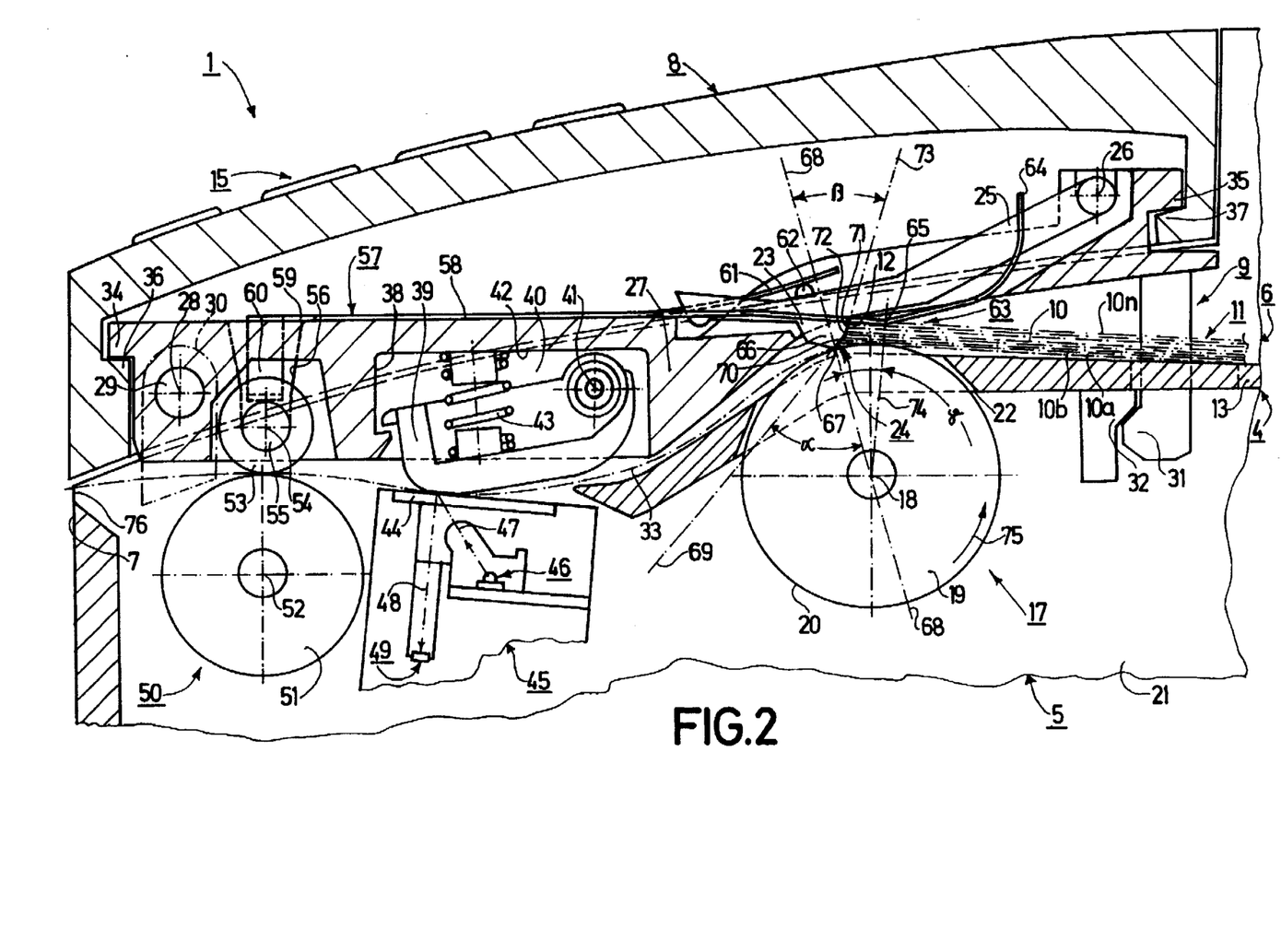
FIG. 2 is a cross-sectional view showing a relevant part of the apparatus shown in FIG. 1, which apparatus comprises a separating device for separating the outermost record carrier from a stack of record carriers, which device comprises a separating roller and a holdback member.

The apparatus 1 has a housing 4, which comprises a lower housing section 5 and a first upper housing section 6, which is fixed to the lower housing section 5, and a second upper housing section 8, which is pivotable relative to the lower housing section 5 about a pivotal axis situated in a front area 7. A holder 9 has been provided in the first upper housing section 6 to hold a stack 11 of at least two but preferably more record carriers 10 formed by sheets of paper. The stack 11 of record carriers 10 comprises n record carriers referenced 10a, 10b, ... 10n. The number n may be, for example, 5, 10 or 15. The record carriers 10 can be inserted into the holder 9 with their leading edges 12 in the longitudinal direction of the record carriers 10. In their from areas the surfaces of the record carriers 10 in the holder 9 are supported by an inclined supporting wall 13 which slopes towards the lower housing section 5 of the housing 4 inside the apparatus 1. In FIG. 2 this supporting wall 13 is shown to extend in a horizontal direction for graphical reasons only and in reality the part of the supporting wall 13 shown in FIG. 2 extends at an angle of approximately 20° to the horizontal. To support the surfaces of the record carriers 10 in their rear areas the apparatus 1 has supporting plate 14 connected to the housing 4 of the apparatus 1 in a manner not shown.

The second upper housing section 8, which is pivotable relative to the lower housing section 5, carries an input device 15 having a plurality of keys and a display device 16. By means of the input device 15 it is possible to enter telephone numbers for the selection of other telephones or other facsimile apparatuses. The input device 15 also enables commands for the selection of modes of operation of the facsimile apparatus to be entered. If desired, the entered telephone numbers and selected modes can be displayed on the display device 16.

The apparatus 1 comprises a separating device 17 for separating the currently outermost record carrier from the stack 11. In the present apparatus 1 the outermost record carrier is formed by the currently lowermost record carrier, i.e. by the record carrier 10a in the operating situation shown in FIG. 2. The separating device 17 comprises a separating roller 19 which has a cylindrical circumferential surface 20 and which can be driven by drive means, not shown, so as to be rotatable about a roller axis 18 in a counterclockwise direction as viewed in FIG. 2, in order to drive the outermost record carrier to be separated from the stack 11. The circumferential surface 20 of the separating roller consists of rubber in order to guarantee a maximal coefficient of friction. Instead of rubber a synthetic material having a high coefficient of friction can be used. The spindle materializing the roller axis 18 is rotatably mounted between two side walls 21 of the lower housing section 5. FIG. 2 shows only one of the two side walls 21. With a part of its circumferential surface 20 the separating roller 19 projects from an elongate hole 22 in the supporting wall 13 to allow this surface 20 to cooperate with the outermost record carrier of the stack 11.

The separating device 17 further comprises a holdback member 23 having a holdback surface 24 to retain all the record carriers of the stack 11 except for the outermost record carrier to be separated from the stack 11. The holdback member 23 is integrally connected to a support 25 resembling a lever arm. The support 25 and the holdback member, which is integral with it, consist of a substantially non-elastic material, i.e. of a thermoplastic material. In practice, the use of polyoxymethylene has proved to be very advantageous.

The lever-arm-type support 25 is mounted on a plate-like carrier 27 of the apparatus 1 so as to be pivotable about a pivotal axis 26. The plate-like carrier 27, in its turn, is pivotable about a pivotal axis 28. The pivotal axis 28 is materialized by two journals 29 which are pivotably supported in two mounting lugs 30. The two mounting lugs 30 project from the side walls 21 towards the second upper housing section 8. FIG. 2 shows only one of these two mounting lugs 30 in dash-dot lines.

The plate-like carrier 27 is pivotable between the operating position shown in FIG. 2, in which operating position a rib-shaped latching hook 31 of the carrier 27 engages with a rib-shaped latching nose 32 disposed between side walls 21, and a disengaged position, not shown in FIG. 2, in which disengaged position the plate-like carrier 27 has been pivoted away from the separating roller 19 in a counterclockwise direction as viewed in FIG. 2, thereby exposing most part of a transport path 33, shown in dash-dot lines in FIG. 2, for a record carrier through the apparatus 1, for example to enable components or assemblies which cooperate with record carriers in this transport path 33 to be cleaned.

The second upper housing section 8 is secured to the plate-like carrier 27 by means of two locking ribs 34 and 35 of the carrier 27 which interlock with housing portions 36 and 37 of the second upper housing section 8.

The plate-like carrier 27 has a trough-like recess 38 adjacent the supporting wall 13. In this recess 38 a pressure pad 39 is mounted between two bounding walls 40 of the recess 38 so as to be pivotable about a pivotal axis 41. Two pressure springs 43 are mounted between a bottom wall 42 of the trough-shaped recess 38 and the pressure pad 39 to urge the pressure pad 39 away from the bottom wall 42 of the recess 38.

The pressure pad 39 serves to press a record carrier 10 onto a glass plate 44 of a scanning device 45. The scanning device 45 comprises an array 46 of light-emitting diodes (LEDs) which project light beams 47 onto a record carrier 10 which is pressed onto the glass plate 44 by the pressure pad 39 and is moved over this glass plate 44. By means of the light beams 47 the characters and pictures on a record carrier 10 are scanned, after which reflected light beams 48 are directed to a strip-shaped sensor device 49, which generates electric signals corresponding to the scanned characters and pictures.

In the transport path 33 the scanning device 45 is followed by a driving device 50 for driving a record carrier 10 which has been separated from the stack 11 by means of the separating device 17 and which is also driven for the time being. The driving device 50 comprises a drive roller 51 which is mounted so as to be rotatable about an axis 52 and which can be driven so as to rotate in a counterclockwise direction as viewed in FIG. 2. The spindle materializing the axis 52 is disposed between the two side walls 21 of the lower housing section 5. The driving device 50 further comprises a pressure roller 53 which is rotatable about an axis 54. The axis 54 is materialized by two journals 55, which each engage in a funnel-like recess 56 in the plate-like carrier 27.

A integral blade spring structure 57 is secured to the plate-like carrier 27 in a manner not shown. The blade spring structure 57 is made of steel. The blade spring structure 57 comprises a substantially rectangular base 58. The base 58 carries two projections 59 which extend substantially in a direction transverse to the axis 54 of the pressure roller 53, from which projections two blade-spring arms 60 extend parallel to the axis 54 of the pressure roller 53, which arms are directed to one another and are bent towards the journals 55. The two blade-spring arms 60, of which only one blade-spring arm 60 is shown in FIG. 2, urge the journals 55 into the funnel-like recesses 56 and also allow the pressure roller 55 to be lifted off the drive roller 51 when a record carrier engages between these two rollers 51 and 53.

Another blade-spring arm 61, which extends transversely to the roller axis 18 of the separating roller 19, projects from the base 58 of the blade-spring structure 57 substantially in the center and bears upon a projection 62 of the support 25 and thereby exerts such a spring load on the support 25 that the holdback member 23 is resiliently urged against the separating roller 19.

By means of the pivotable support 25 it is achieved that the holdback member 23 can perform two relative movements with respect to the separating roller 19, i.e. a relative movement towards the separating roller 19 and an opposite relative movement away from the separating roller 19. The support 25 thus forms means for enabling at least one relative movement between the separating roller 19 and the holdback member 23. The blade-spring arm 61, which exerts the spring load for the support 25 via the projection 62, then forms spring means for producing a relative movement between the separating roller 19 and the holdback member 23, i.e. the relative movement of the holdback member 23 towards the separating roller 19. As a result of the relative movement between the separating roller 19 and the holdback member 23 caused by the blade-spring arm 61, the cylindrical circumferential surface 20 of the separating roller 19 and a part of the holdback member 23 can be brought into contact with one another. As is apparent from FIG. 2, this results in a feed-in zone 63 for the record carriers 10 of the stack 11 to the separating roller 19 being formed between the circumferential surface 20 of the separating roller 19 and the holdback surface 24 of the holdback member 23, which zone tapers towards the circumferential surface 20 of the separating roller 19. In this feed-in zone 63 the currently outermost record carrier to be separated is in contact with the circumferential surface 20 of the separating roller 19.

The blade-spring structure 57 has two further strip-shaped blade-spring arms 64 which project from the base 58 and extend transversely to the roller axis 18 of the separating roller 19, FIG. 2 showing only one of these two blade-spring arms 64. Each end of the holdback member 23 is adjoined by one of the two strip-shaped blade-spring arms 64 viewed in the direction of the roller axis 18 of the separating roller 19. The two blade-spring arms 64 each have an angular portion 65, the two angular portions 65 being arranged so as to overlap one another viewed in the direction of the roller axis 18. Each of the two angular portions 65 enables a spring load in the direction of the circumferential surface 20 of the separating roller 19 to be exerted on the record carriers 10a, 10b, ... 10n situated between the circumferential surface 20 of the separating roller 19 and the holdback surface 24 of the holdback member 23.

The apparatus 1 shown in FIGS. 1 and 2 now has the advantageous feature that the holdback member 23 comprises a substantially wedge-like portion 66 which, similarly to the entire support 25 and the holdback member 23, is made of a non-elastic material, viz. of polyoxymethylene, and has a bounding edge 67 which extends parallel to the roller axis 18 of the separating roller 19 and by which the wedge-like portion 66 of the holdback member 23 can be brought into contact with the circumferential surface 20 of the separating roller 19, and that the holdback surface 24 of the holdback member 23 bounds the wedge-like portion 66 and terminates at the bounding edge 67.

In the apparatus 1 shown in FIGS. 1 and 2 the construction has been selected in such a manner that, when the bounding edge 67 of the wedge-like portion 66 of the holdback member 23 is directly, i.e. without an interposed record carrier 10, in contact with the circumferential surface 20 of the separating roller 19, a radial plane 68 containing the roller axis 18 of the separating roller 19 and the bounding edge 67 and a tangential plane 69 containing the bounding edge 67 and tangent to the holdback surface 24 enclose an angle α of approximately 56° with one another.

In the embodiment of the apparatus shown in FIGS. 1 and 2 the holdback surface 24 has a flat surface portion 70 starting from the bounding edge 67. Adjacent the flat surface portion 70 starting from the bounding edge 67 the holdback surface 24 has a further flat surface portion 71, the two surface portions 70 and 71 adjoining one another along a transition line 72 which extends parallel to the bounding edge 67. The two flat surface portions 70 and 71 provide zones which differ in respect of the attainable holdback forces along the holdback surface 24, the holdback forces attainable with the further flat holdback surface 71, which is steeper, being larger than those attainable with the flat holdback surface 70, which is less steep.

When the bounding edge 67 of the wedge-like portion 66 of the holdback member 23 is directly, i.e. without an interposed record carrier 10, in contact with the circumferential surface 20 of the separating roller 19, a radial plane 68 containing the roller axis 18 of the separating roller 19 and the bounding edge 67 and a tangential plane 69 which is tangent to the surface portion 70, which is flat starting from the bounding edge 67, enclose an angle α of approximately 56° with one another, and the radial plane 68 containing the roller axis 18 of the separating roller 19 and the bounding edge 67 and a tangential plane 73 which is tangent to the further flat surface portion 71 enclose an angle β which is smaller than the angle α, i.e. approximately 24° smaller in the present case, so that the angle β is approximately 32° in the present case.

With respect to the construction of the blade-spring arms 64 it is to be noted that, when the angular portions 65 of the two blade-spring arms 64 are in contact with the circumferential surface 20 of the separating roller 19 without an interposed record carrier 10, which operating condition is not as represented in FIG. 2 because in the operating condition shown in FIG. 2 record carriers 10a, 10b ... 10n are situated between the circumferential surface 20 of the separating roller 19 and the angular portions 65 of the blade-spring arms 64, the radial plane 68 containing the roller axis 18 of the separating roller 19 and the bounding edge 67 of the wedge-like portion 66 of the holdback member 23 and a further radial plane 74 containing the roller axis 18 of the separating roller 19 and the contact locations of the two angular portions 65 of the two blade-spring arms 64 with the circumferential surface 20 of the separating roller 19 enclose an angle γ with one another, which is approximately 21° in the present case.

When a stack 11 of record carriers 10 is loaded into the holder 9 of the apparatus 1 shown in FIGS. 1 and 2 the operating condition shown in FIG. 2 is obtained. In this operating condition the record carriers 10 contact the holdback surface 24 of the holdback member 23 with their leading edges 12. To separate the lowermost record carrier 10a from the track 11 the separating roller 19 is set into rotation, in a manner not shown, in the direction indicated by an arrow 75, i.e. counterclockwise. The separating roller 19, whose circumferential surface 20 consists of rubber, thus exerts a comparatively large, essentially friction-dependent, driving force on the lowermost record carrier 10a, which force is larger than the friction-dependent holdback force acting between the lowermost record carrier 10a and the next record carrier 10b of the stack. As a result of this, the lowermost record carrier 10a is displaced relative to the following record carrier 10b and its leading edge 12 is moved towards the bounding edge 67. As soon as the leading edge 12 of the lowermost record carrier 10a has reached the bounding edge 67, the bounding edge 67 and hence the entire holdback member 23 together with the support 25 carrying the holdback member 23 is moved slightly, i.e. by a distance equal to the thickness of the lowermost record carrier 10a, away from the separating roller 19 against the force exerted by the blade-spring arm 61, so that the lowermost record carrier 10a engages between the circumferential surface 20 of the separating roller 19 and the bounding edge 67 of the holdback member 23. However, it is now assured that the next record carrier 10b is kept away from the bounding edge 67 as a result of the comparatively steep holdback surface 24, i.e. of its surface portion 70, and as a result of the action of the blade-spring arms 64, whose angular portions 65 exert pressure on the record carriers 10 in the area of the feed-in zone 63, which pressure keeps the edges 12 of the record carriers 10 away from the bounding edge 67. This provides a high separation reliability, so that actually only the lowermost record carrier is separated from the stack 11 of record carriers 10.

After this, the separating roller 19, which continues to be driven, moves the lowermost record carrier along the transport path 33 until the record carrier enters the area between the scanning device 45 and the pressure pad 39 and finally the area between the drive roller 51 and the pressure roller 53. As soon as the previously separated record carrier 10 has been engaged by the drive roller 51 and the pressure roller 53 this record carrier 10 is driven and moved by the drive roller 51, which has already been set into rotation in a manner not shown in a counterclockwise direction as viewed in FIG. 2, in conjunction with the pressure roller 53, while at the same time the drive for the separating roller 19 is disengaged. The drive roller 51 in conjunction with the pressure roller 53 feed a record carrier 10 thus driven through an exit opening 76 at the front 7 of the apparatus 1, thus enabling the driven and scanned record carrier 10 to be removed by hand by a user of the apparatus 1.

By means of the above construction of the holdback member 23, which comprises a substantially wedge-like portion 66 made of a non-elastic material and having a bounding edge 67 in which its holdback surface 24 terminates, it has been achieved in a simple manner that the feed-in zone 63 for the record carriers 10 to the separating roller 19 is not bounded smoothly but sharply by the bounding edge 67 of the wedge-like portion 66 of the holdback member 23, and that the inclination of the holdback surface 24 at the location of the wedge-like portion 66 of the holdback member 23 relative to the planes of the sheet-like record carriers 10 to be separated is comparatively large, as a result of which comparatively large holdback forces are exerted on the record carriers 10 at the location of the leading edges 12, which ensures that in the present case only the lowermost record carrier to be separated, which in order to be separated is driven by separating roller 19 whose circumferential surface 20 consists of rubber with a high coefficient of friction, is separated from the stack 11 of record carriers 10. A further advantage of the construction described above is that the holdback member 23 consists of a non-elastic material, i.e. a thermoplastic material such as polyoxymethylene, so that the holdback member 23 exerts only a comparatively small friction-dependent holdback force on a previously separated record carrier 10 situated between the bounding edge 67 of the holdback member 23 and the circumferential surface 20 of the separating roller 19, which is advantageous for a correct drive of a record carrier 10 by means of the drive roller 51 in conjunction with the pressure roller 53.

Figure 3:
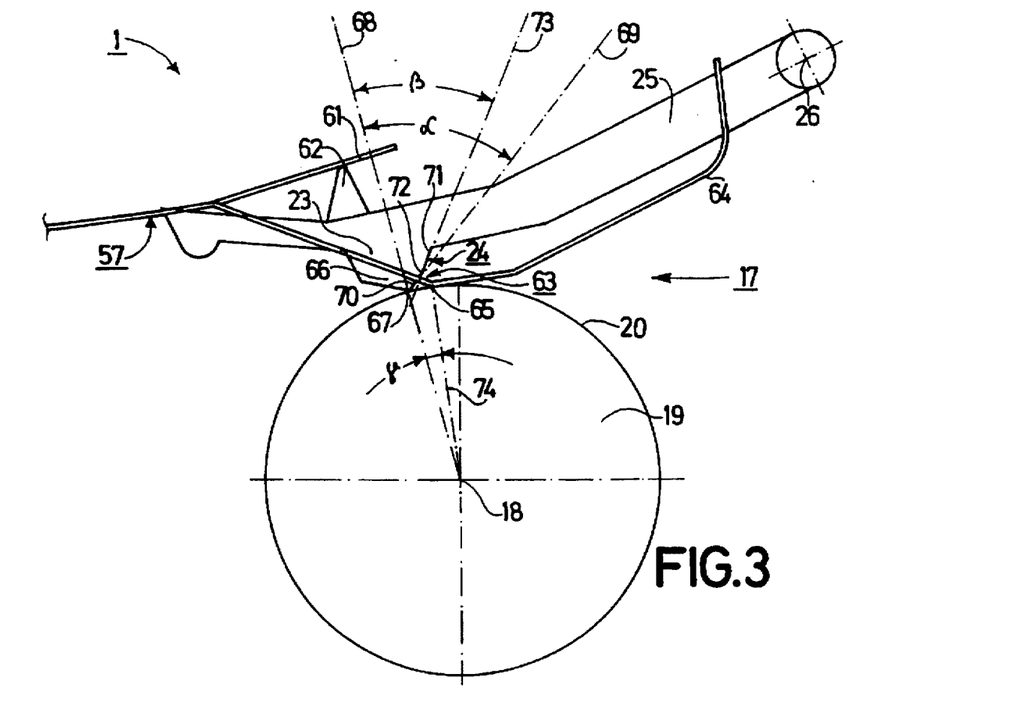
FIG. 3 shows diagrammatically a separating roller and a holdback member of a separating device of an apparatus in accordance with a second embodiment of the invention.

FIG. 3 shows a further apparatus 1 in accordance with the invention forming a second embodiment of the invention, of which it shows only the separating roller 19 and the holdback member 23 of a separating device 17, which member is carried by a pivotable lever-arm-type support 25, as well as the blade-spring arms 61 and 64 of a blade-spring structure 57. In the embodiment of the apparatus 1 shown in FIG. 3 the values selected for the angles or α, β and γ have proved to be very advantageous in practice. In the embodiment of the apparatus 1 in FIG. 3 the angle α is approximately 53°, the angle β is approximately 15° smaller than the angle α of 53° and is equal to approximately 38°, and the angle γ is approximately 7°.

Figure 4:
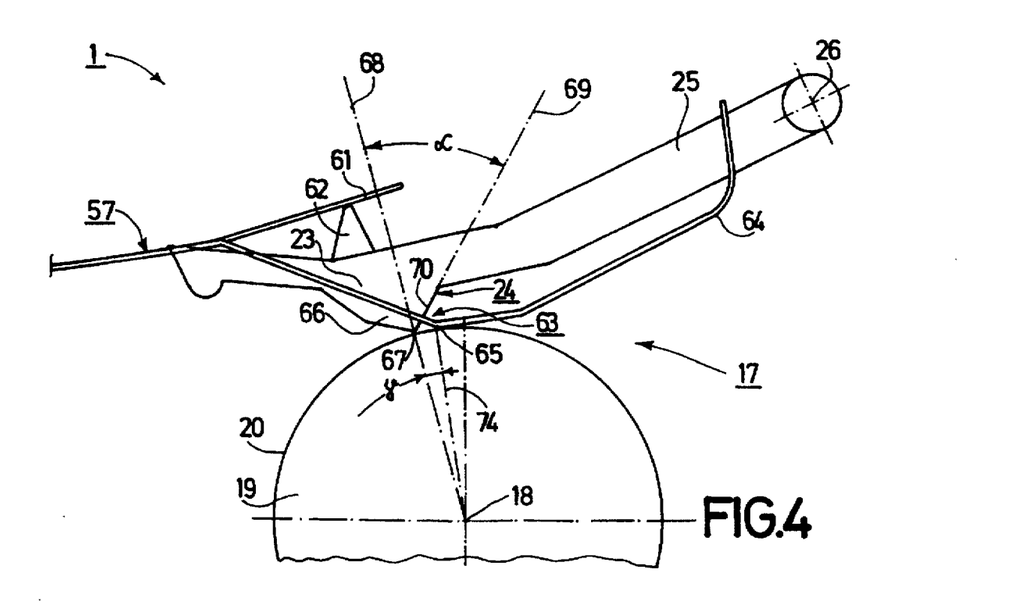
FIG. 4, in the same way as FIG. 3, shows a separating roller and a holdback member of a separating device of an apparatus in accordance with a third embodiment of the invention.

FIG. 4 shows an apparatus 1 in accordance with a third embodiment of the invention and, in the same way as FIG. 3, it shows only the separating roller 19 and the holdback member 23 of a separating device 17, which member is carried by a pivotable lever-arm-type support 25, as well as the blade-spring arms 61 and 64 of a blade-spring structure 57. In the embodiment of the apparatus 1 shown in FIG. 4 the holdback surface 24, which bounds a wedge-like portion 66 of the holdback member 23, has only one surface portion 70, which is flat starting from the bounding edge 67. The angle α has a value of approximately 43° and the angle γ has a value of approximately 7°.

Figure 5:
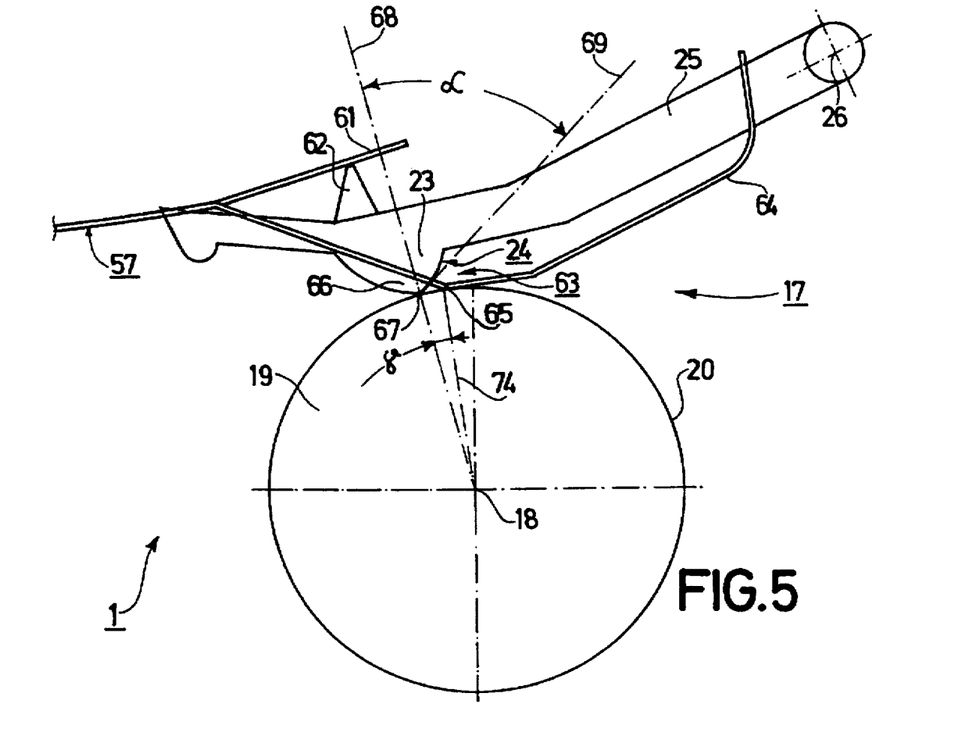
FIG. 5, in the same way as FIGS. 3 and 4, shows a separating roller and a holdback member of a separating device of an apparatus in accordance with a fourth embodiment of the invention.
Figure 6:
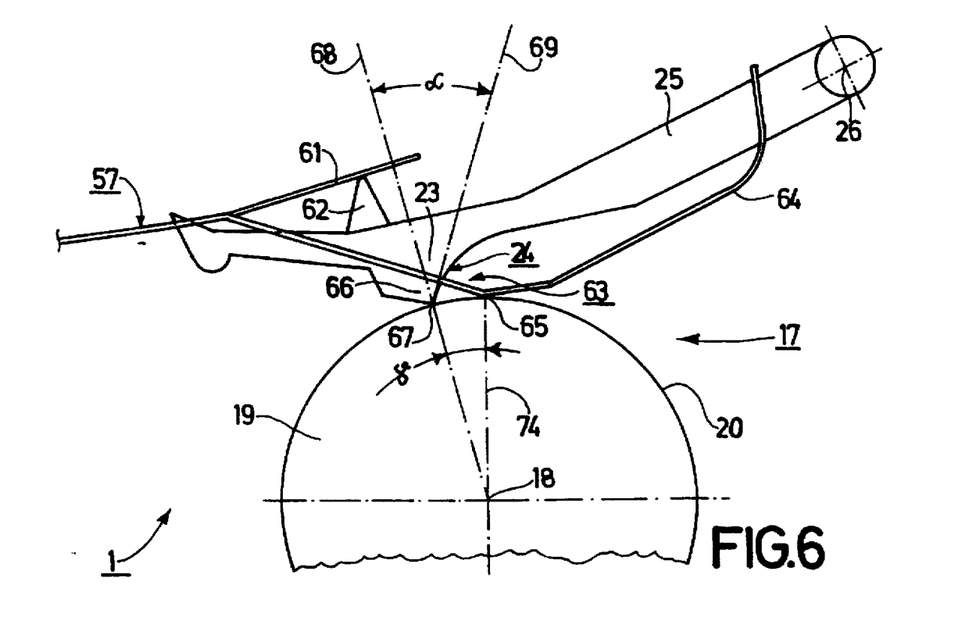
FIG. 6, in the same way as FIGS. 3, 4 and 5, shows a separating roller and a holdback member of a separating device of an apparatus in accordance with a fifth embodiment of the invention.

FIG. 6 shows an apparatus 1 in accordance with a fifth embodiment of the invention and, in the same way as FIGS. 3, 4 and 5, it shows only the separating roller 19 and the holdback member 23 of a separating device 17, which member is carried by a pivotable lever-arm-type support 25, as well as the blade-spring arms 61 and 64 of a blade-spring structure 57. In the embodiment of the apparatus 1 shown in FIG. 6 the holdback member 23 comprises a wedge-like portion 66 bounded by a concave holdback surface 24. The radial plane 68 containing roller axis 18 of the separating roller 19 and the bounding edge 67 and the tangential plane 69 which is tangent to the concave holdback surface 24 and which contains the bounding edge 67 enclose an angle a of approximately 31°. The angle γ between the radial plane 68 and the radial plane 74 containing the contact locations of the two angular portions 65 has a value of approximately 15° in the embodiment of the apparatus shown in FIG. 6.

The apparatuses 1 shown in FIGS. 3, 4, 5 and 6 also provide a high separation reliability and the respective holdback members exert only small friction-dependent holdback forces on the respective record carrier that has already been separated.

The invention is not limited to the embodiments described hereinbefore. For example, the invention can also be used in apparatuses in which the currently outermost record carrier is not the currently lowermost record carrier but the currently uppermost record carrier. The invention can also be used in copiers, or in printers, or in scanners in which a document is optically scanned and subsequently the picture content is digitized and stored in a storage device. It is to be noted that a holder of an apparatus need not necessarily be loaded with a stack of record carriers but may also be loaded with a single record carrier. To enable a relative movement between the separating roller and the holdback member of a separating device of an apparatus it is also possible to provide means by which the separating roller is movably supported in this apparatus in such a manner that it can be moved transversely to its roller axis with respect to a holdback member which is stationarily mounted in the apparatus.

I claim:

1. An apparatus which is constructed for consecutively processing sheet-like record carriers and which comprises;
    a holder for holding a stack of at least two record carriers and
    a separating device for separating the currently outermost record carrier of the stack from the stack;
    which separating device comprises;
        at least one separating roller with a cylindrical circumferential surface,
        which separating roller is drivable so as to be rotatable about a roller axis in order to drive the currently outermost record carrier to be separated from the stack, and
        at least one holdback member with a holdback surface for retaining all the record carriers of the stack except for the outermost record carrier to be separated from the stack;
        said separating roller and holdback member being movable relative to one another,
        spring means for producing such a relative movement between the separating roller and the holdback member,
        the relative movement between the separating roller and the holdback member caused by the spring means enabling the cylindrical circumferential surface of the separating roller and a part of the holdback member to be brought into contact with one another, and
    a feed-in zone for the record carriers of the stack to the separating roller being formed between the circumferential surface of the separating roller and the holdback surface of the holdback member,
        which zone tapers towards the circumferential surface of the separating roller, in which feed-in zone the currently outermost record carrier to be separated is in contact with the circumferential surface of the separating roller, characterized in that the holdback member
    comprises a substantially wedged portion made of a non-elastic material and said wedged portion having a bounding edge which extends parallel to the roller axis of the separating roller and which can be brought into contact with the circumferential surface of the separating roller, and
    the holdback surface of the holdback member bounds the wedged portion and terminates at the bounding edge, further characterized in that when the bounding edge of the wedged portion of the holdback member is directly in contact with the circumferential surface of the separating roller, a radial plane containing the roller axis of the separating roller and the bounding edge and a tangential plane containing the bounding edge and tangent to the holdback surface enclose an angle α with one another, and wherein said angle α does not change substantially when said relative movement occurs between said holdback member and said separating roller.

2. An apparatus as claimed in claim 1, characterized in that the angle α lies within a range of angles between approximately 30° and approximately 65°.

3. An apparatus as claimed in claim 2, characterized in that the angle α is approximately 53°.

4. An apparatus as claimed in any one of the preceding claims, characterized in that the holdback surface comprises has a surface portion which is flat starting from the bounding edge.

5. An apparatus as claimed in claim 4, characterized in that adjacent the flat surface portion starting from the bounding edge the holdback surface has a further flat surface portion, and the two surface portions adjoin one another along a line-shaped transition zone which extends parallel to the bounding edge.

6. An apparatus as claimed in claim 5, characterized in that when the bounding edge of the wedged portion of the holdback member is directly in contact with the circumferential surface of the separating roller, the tangential plane is tangent to the surface portion which is flat starting from the bounding edge, and the radial plane containing the roller axis and the bounding edge and a further tangential plane which is tangent to the further flat surface portion enclose an angle $\beta$ with one another which is smaller than the angle $\alpha$.

7. An apparatus as claimed in claim 6, characterized in that the angle $\beta$ is approximately 10° to approximately 20° smaller than the angle $\alpha$.

8. An apparatus as claimed in claim 7, characterized in that the angle $\alpha$ is approximately 15° smaller than the angle $\alpha$.

9. An apparatus as claimed in claim 1, characterized in that at least the wedged portion of the holdback member consists of a thermoplastic material.

10. An apparatus as claimed in claim 9, characterized in that at least the wedged portion of the holdback member consists of polyoxymethylene.

11. An apparatus as claimed in claim 1, characterized in that the holdback member and a support for this holdback member are formed as a single integral part.

12. An apparatus as claimed in claim 11, characterized in that the support for the holdback member is formed by a lever support which is pivotable about a support axis.

13. An apparatus as claimed in claim 12, characterized in that a blade-spring arm has been provided as the spring means for producing a relative movement between the separating roller and the holdback member, which blade-spring arm acts upon the pivotable lever support and which urges the holdback member resiliently towards the circumferential surface of the separating roller.

14. An apparatus as claimed in claim 13, characterized in that viewed in the direction of the roller axis of the separating roller each end of the wedged portion of the holdback member is adjoined by a strip-shaped blade-spring arm which extends transversely to the roller axis and the two blade-spring arms each have an angular portion, the two angular portions being arranged so as to overlap one another viewed in the direction of the roller axis and each of the two angular portions enabling a spring load in a direction towards the circumferential surface of the separating roller to be exerted on the record carriers situated between the circumferential surface of the separating roller and the holdback surface of the holdback member.

15. An apparatus as claimed in claim 14, characterized in that the blade-spring arm which acts upon the pivotable lever support and the two blade-spring arms which each have an angular portion to exert a spring load on the record carriers situated in the feed-in zone form parts of an integral blade spring structure.

16. An apparatus as claimed in claim 1, characterized in that viewed in the direction of the roller axis of the separating roller each end of the wedged portion of the holdback member is adjoined by a strip-shaped blade-spring arm which extends transversely to the roller axis and the two blade-spring arms each have an angular portion, the two angular portions being arranged so as to overlap one another viewed in the direction of the roller axis and each of the two angular portions enabling a spring load in a direction towards the circumferential surface of the separating roller to be exerted on the record carriers situated between the circumferential surface of the separating roller and the holdback surface of the holdback member.

17. An apparatus as claimed in claim 16, characterized in that when the angular portions of the two blade-spring arms are directly in contact with the circumferential surface of the separating roller, the radial plane containing the roller axis of the separating roller and the bounding edge of the wedged portion of the holdback member and a further radial plane containing the roller axis of the separating roller and the contact locations of the two angular portions of the two blade-spring arms with the circumferential surface of the separating roller enclose an angle $\gamma$ with one another, which angle is within a range of angles between approximately 2° and approximately 25°.

18. An apparatus as claimed in claim 17, characterized in that the angle $\gamma$ is approximately 7°.

* * * * *